US012676297B2

(12) United States Patent
Haga et al.

(10) Patent No.: US 12,676,297 B2
(45) Date of Patent: Jul. 7, 2026

(54) ROLL PRESS APPARATUS AND METHOD FOR PRODUCING COMPRESSED STRIP-SHAPED ELECTRODE SHEET

(71) Applicants: Prime Planet Energy & Solutions, Inc., Tokyo (JP); TOYOTA JIDOSHA KABUSHIKI KAISHA, Aichi-ken (JP)

(72) Inventors: Kengo Haga, Nagoya (JP); Tomofumi Hirukawa, Nisshin (JP); Kota Nakamura, Himeji (JP); Tomoya Suzuki, Seto (JP); Hideji Naito, Tajimi (JP); Yoshihide Enomoto, Nagakute (JP)

(73) Assignees: PRIME PLANET ENERGY & SOLUTIONS, INC., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1002 days.

(21) Appl. No.: 17/676,230

(22) Filed: Feb. 21, 2022

(65) Prior Publication Data

US 2022/0293901 A1      Sep. 15, 2022

(30) Foreign Application Priority Data

Mar. 12, 2021     (JP) ................................. 2021-040501

(51) Int. Cl.
*H01M 4/04*          (2006.01)
*H01M 4/139*         (2010.01)
(52) U.S. Cl.
CPC ....... *H01M 4/0435* (2013.01); *H01M 4/0404* (2013.01); *H01M 4/139* (2013.01)

(58) Field of Classification Search
CPC ...... H01M 4/04; H01M 4/0435; H01M 4/043; H01M 4/139; H01M 4/0404
See application file for complete search history.

(56) References Cited

U.S. PATENT DOCUMENTS

| | | | |
|---|---|---|---|
| 2003/0029333 A1 | 2/2003 | Sato et al. | |
| 2019/0296322 A1* | 9/2019 | Hirukawa | ........... H01M 4/0435 |
| 2022/0285665 A1* | 9/2022 | Lee | ....................... B30B 15/308 |

FOREIGN PATENT DOCUMENTS

| | | |
|---|---|---|
| JP | 2002313327 A | 10/2002 |
| JP | 2008226502 A | 9/2008 |

(Continued)

OTHER PUBLICATIONS

Astro_Pak (Year: 2020).*
Surface Roughness of Roller, Buetow et al. (Year: 2015).*

*Primary Examiner* — Tiffany Legette
*Assistant Examiner* — Douglas C Marroquin
(74) *Attorney, Agent, or Firm* — HAUPTMAN HAM, LLP

(57) ABSTRACT

A roll press apparatus includes a first press roll and a second press roll. The first press roll includes a first contact part configured to contact an active material portion of a strip-shaped electrode sheet and a second contact part configured to contact an active-material absent portion of the strip-shaped electrode sheet. The second contact part has a large frictional-force generating form that causes a larger frictional force to be generated between the second contact part and the active-material absent portion of the strip-shaped electrode sheet than an imaginary frictional force which would be generated if the active-material absent portion of the strip-shaped electrode sheet were made to contact the first contact part.

8 Claims, 6 Drawing Sheets

(56)     References Cited

FOREIGN PATENT DOCUMENTS

| JP | 201442923 A | 3/2014 |
|----|-------------|--------|
| JP | 2014103068 A | 6/2014 |
| JP | 2014107166 A | 6/2014 |
| JP | 2014120273 A | 6/2014 |
| JP | 2015115116 A | 6/2015 |
| JP | 2016181345 A | 10/2016 |
| JP | 2017228349 A | 12/2017 |
| JP | 201933041 A | 2/2019 |

* cited by examiner

ROLL PRESS APPARATUS AND METHOD FOR PRODUCING COMPRESSED STRIP-SHAPED ELECTRODE SHEET

CROSS-REFERENCE TO RELATED APPLICATIONS

This application is based upon and claims the benefit of priority to Japanese Patent Application No. 2021-040501 filed on Mar. 12, 2021, the entire contents of which are incorporated herein by reference.

BACKGROUND

Technical Field

The present disclosure relates to a roll press apparatus for roll-pressing a strip-shaped electrode sheet to compress an active material layer and a method for producing a compressed strip-shaped electrode sheet by roll-pressing a strip-shaped electrode sheet to compress an active material layer.

SUMMARY

Technical Problems

As an electrode sheet to be used for a lithium ion secondary battery or the like, there has been known a compressed strip-shaped electrode sheet including a strip-shaped current collecting foil and a compressed active material layer pressed in a thickness direction on the current collecting foil. Further, such an electrode sheet includes a compressed strip-shaped electrode sheet 901, as shown in FIG. 6, configured such that a central part in a width direction FH is referred to as a strip-shaped active material portion 911 having compressed active material layers 905 and 906 located above and below in a thickness direction GH and both side parts in the width direction FH are each referred to as a strip-shaped active-material absent portion 912 having neither the compressed active material layer 905 nor the compressed active material layer 906.

This compressed strip-shaped electrode sheet 901 can be produced by for example the following method. Firstly, undried active material layers 905X and 906X are formed in a strip shape on a strip-shaped current collecting foil 903 at the center in the width direction FH. Then, these layers 905X and 906X are dried by heating to respectively form strip-shaped active material layers 905Z and 906Z. Secondly, a strip-shaped electrode sheet 901Z provided with those active material layers 905Z and 906Z is roll-pressed while being conveyed in a longitudinal direction EH to compress the active material layers 905Z and 906Z in the thickness direction GH, thereby forming the compressed active material layers 905 and 906. The compressed strip-shaped electrode sheet 901 is thus completed. A conventional art related to the above method is disclosed in, for example, Japanese unexamined patent application publication No. 2017-228349.

However, during roll press of the strip-shaped electrode sheet 901Z, especially, a part of each active-material absent portion 912 near the boundary between each active-material absent portion 912 and the active material portion 911, oblique wrinkles SW extending obliquely from the inside in the width direction FH and an upstream side toward the outside in the width direction FH and a downstream side EDH may repeatedly occur.

The reason why such oblique wrinkles SW occur is considered to be as follows. Specifically, in the compressed strip-shaped electrode sheet 901 after subjecting to a roll press process, the active material portion 911 has been stretched in the longitudinal direction EH, whereas the active-material absent portions 912, which are thinner than the active material portion 911, are hardly pressed and thus have been little stretched. Therefore, the tension applied to the compressed strip-shaped electrode sheet 901 toward the downstream side EDH is hardly applied to the active material portion 911 but is applied to the active-material absent portions 912. When a large tension toward the downstream is applied to the active-material absent portions 912 as above, the reaction force is concentrically generated in a part of each active-material absent portion 912 near the boundary between each active-material absent portion 912 and the active material portion 911. Thus, wrinkles SW in a form caused by the reaction force concentrated near the above boundary, that is, oblique wrinkles SW, are conceivably generated.

The present disclosure has been made to address the above problems and has a purpose to provide a roll press apparatus capable of roll-pressing a strip-shaped electrode sheet including an active material portion and an active-material absent portion, each of which has a strip shape, while suppressing the generation of wrinkles in the active-material absent portion, and a method for producing a compressed strip-shaped electrode sheet while preventing the generation of wrinkles in the active-material absent portion during roll press of the strip-shaped electrode sheet.

Means of Solving the Problems

To achieve the above-mentioned purpose, one aspect of the present disclosure provides a roll press apparatus configured to roll-press a strip-shaped electrode sheet, which is provided with: a strip-shaped current collecting foil; and a strip-shaped active material layer located on the current collecting foil and extended in a longitudinal direction of the current collecting foil, while conveying the strip-shaped electrode sheet in the longitudinal direction to compress the active material layer of the strip-shaped electrode sheet, the strip-shaped electrode sheet including: a strip-shaped active material portion extended in the longitudinal direction and including the active material layer in a thickness direction of the current collecting foil, and a strip-shaped active-material absent portion extended in the longitudinal direction and arranged adjacent to the active material portion in a width direction of the current collecting foil, wherein the active-material absent portion does not include the active material layer in the thickness direction and has a thinner thickness than the active material portion, wherein the roll press apparatus comprises a first press roll and a second press roll, which are arranged in parallel to each other with a gap, the first press roll includes: a first contact part configured to contact the active material portion of the strip-shaped electrode sheet; and a second contact part configured to contact the active-material absent portion of the strip-shaped electrode sheet, and the second contact part of the first press roll is configured, differently from the first contact part, to have a large frictional-force generating form that causes a larger frictional force to be generated between the second contact part and the active-material absent portion of the strip-shaped electrode sheet than an imaginary frictional force which would be generated if the first contact part of the first press roll were made to contact the active-material absent portion of the strip-shaped electrode sheet.

In the roll press apparatus, the second contact part which comes into contact with the active-material absent portion of the strip-shaped electrode sheet has the large frictional-force generating form to generate a larger frictional force with respect to the active-material absent portion than an imaginary frictional force which could be generated if the active-material absent portion were made to contact the first contact part. This configuration of the second contact part is different from the first contact part which comes into contact with the active material portion of the strip-shaped electrode sheet. Accordingly, during roll press of the strip-shaped electrode sheet, a relatively large frictional force is generated between the second contact part of the first press roll and the active-material absent portion of the strip-shaped electrode sheet. By this frictional force, the tension applied in a downstream direction to the the active-material absent portion is dispersed, thus reducing the reaction force to be generated in a part of the active-material absent portion near the boundary with the active material portion. This configuration can therefore prevent oblique wrinkles from occurring in the active-material absent portion near that boundary.

The strip-shaped electrode sheet may include for example a strip-shaped electrode sheet configured such that strip-shaped active-material absent portions are each arranged adjacently on each side of an active material portion in the width direction. Alternatively, it may also include a strip-shaped electrode sheet configured such that a plurality of strip-shaped active material portions and a plurality of strip-shaped active-material absent portions are alternately arranged in the width direction.

The active-material absent portion may include for example an active-material absent portion formed of only a current collecting foil and besides an active-material absent portion formed of a current collecting foil formed with a protective layer having a thinner thickness than the active material layer.

Another aspect of the present disclosure provides a method for producing a compressed strip-shaped electrode sheet including a strip-shaped current collecting foil and a compressed strip-shaped active material layer compressed in a thickness direction of the current collecting foil, wherein the method comprises: electrode-sheet forming of forming a strip-shaped electrode sheet provided with the current collecting foil and a strip-shaped active material layer located on the current collecting foil and extended in a longitudinal direction of the current collecting foil, the strip-shaped electrode sheet including: a strip-shaped active material portion extended in the longitudinal direction and including the active material layer in the thickness direction of the current collecting foil; and a strip-shaped active-material absent portion extended in the longitudinal direction and arranged adjacent to the active material portion in a width direction of the current collecting foil, wherein the active-material absent portion does not include the active material portion in the thickness direction and has a thinner thickness than the active material portion; and pressing of roll-pressing the strip-shaped electrode sheet by a first press roll and a second press roll, which are arranged in parallel to each other with a roll gap, while conveying the strip-shaped electrode sheet in the longitudinal direction to form the compressed strip-shaped electrode sheet provided with the compressed active material layer, the first press roll includes: a first contact part configured to contact the active material portion of the strip-shaped electrode sheet; and a second contact part configured to contact the active-material absent portion of the strip-shaped electrode sheet, the second contact part of the first press roll is configured, differently from the first contact part, to have a large frictional-force generating form that causes a larger frictional force to be generated between the second contact part and the active-material absent portion of the strip-shaped electrode sheet than an imaginary frictional force which would be generated if the first contact part of the first press roll were made to contact the active-material absent portion of the strip-shaped electrode sheet, and the pressing is performed with the second contact part of the first press roll in contact with the active-material absent portion of the strip-shaped electrode sheet.

In the foregoing production method of the compressed strip-shaped electrode sheet, the pressing is performed using the first press roll configured such that the second contact part which comes into contact with the active-material absent portion of the strip-shaped electrode sheet has the large frictional-force generating form, differently from the first contact part which comes into contact with the active material portion of the strip-shaped electrode sheet. Specifically, the second contact part of the first press roll is configured to generate the larger frictional force with respect to the active-material absent portion than the imaginary frictional force which would be generated if the active-material absent portion were made to contact the first contact part. Accordingly, during roll press of the strip-shaped electrode sheet, the tension applied in a downstream direction to the the active-material absent portion is dispersed by the relatively large frictional force as described above, thus reducing the reaction force to be generated in a part of the active-material absent portion near the boundary with the active material portion. This configuration can therefore prevent oblique wrinkles from occurring in the active-material absent portion near that boundary.

BRIEF DESCRIPTION OF THE DRAWINGS

FIG. 4 is an explanatory view of a first press roll and a second press roll, which are seen from a downstream side in the first embodiment;

FIG. 5 is an explanatory view of a first press roll and a second press roll, which are seen from a downstream side in the second embodiment.

DETAILED DESCRIPTION OF THE EXEMPLARY EMBODIMENTS

First Embodiment

Figure 1:
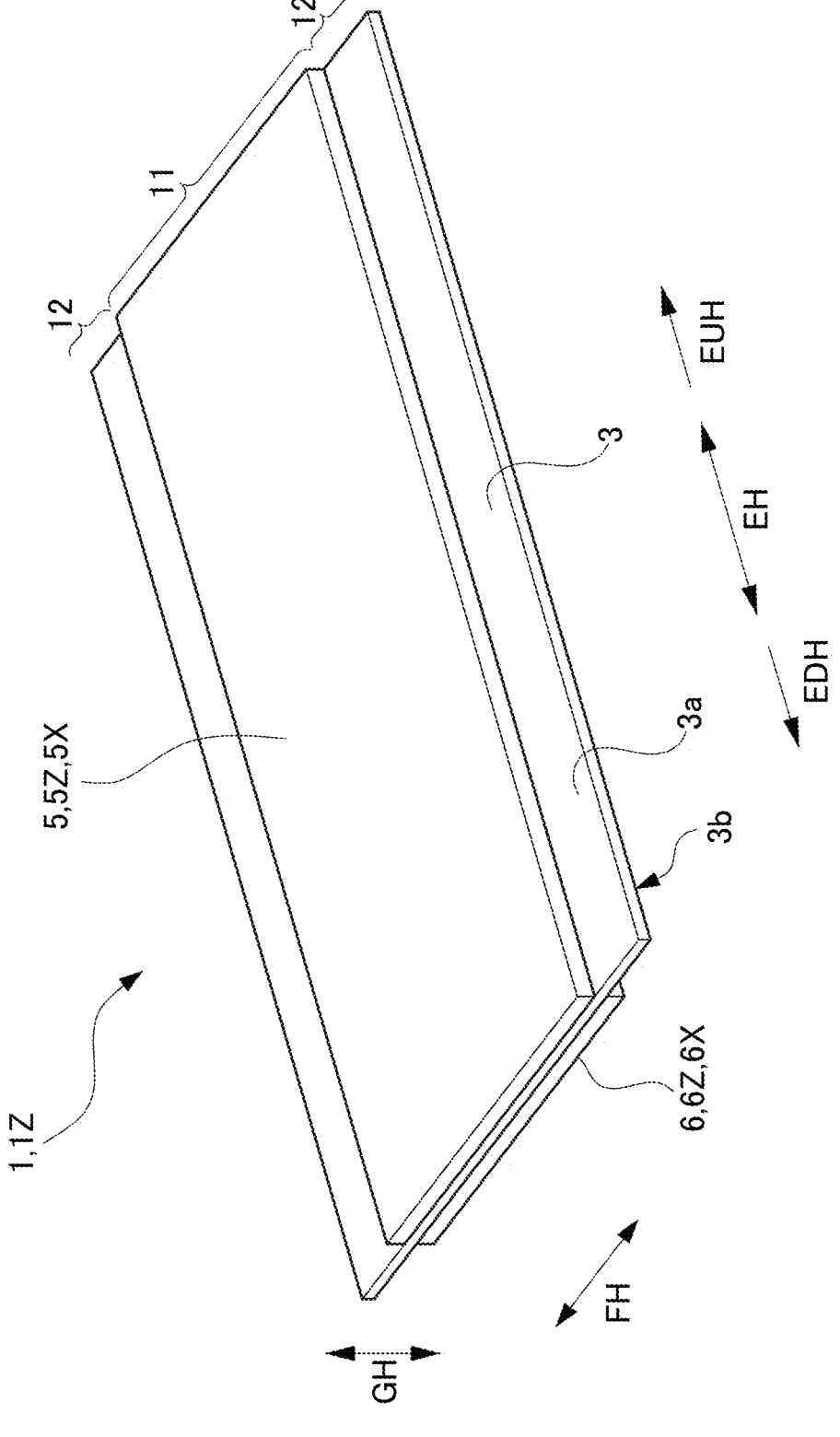
FIG. 1 is a perspective view of a compressed strip-shaped electrode sheet in first and second embodiments.

A detailed description of a first embodiment of this disclosure will now be given referring to the accompanying drawings. FIG. 1 is a perspective view of a compressed strip-shaped electrode sheet 1 in the first embodiment. This compressed strip-shaped electrode sheet 1 is used for a rectangular parallelopiped sealed lithium ion secondary battery to be mounted in a vehicle, such as a hybrid car, a plug-in hybrid car, and an electric car. To be specific, the compressed strip-shaped electrode sheet 1 is a strip-shaped positive electrode sheet to be used for produce a flat-wound or laminated electrode body which is a component of a battery. In the following description, the longitudinal direction EH, the width direction FH, and the thickness direction GH of the compressed strip-shaped electrode sheet 1 are assumed as illustrated in FIG. 1.

The compressed strip-shaped electrode sheet 1 includes a current collecting foil 3 made of an aluminum foil in a strip shape extending in the longitudinal direction EH and having a thickness of about 13 μm. This current collecting foil 3 has a first main surface 3a, on which a first compressed active material layer 5 is formed in a region, which is located in the center in the width direction FH and extended in the longitudinal direction EH, to extend in a strip shape in the longitudinal direction EH, the first compressed active material layer 5 being formed by pressing and compressing in the thickness direction GH to have a thickness of about 60 μm. This first compressed active material layer 5 will be also simply referred to as a compressed active material layer 5. The current collecting foil 3 further has a second main surface 3b on an opposite side of the current collecting foil 3, on which a second compressed active material layer 6 is formed in a region, which is located in the center in the width direction FH and extended in the longitudinal direction EH, to extend in a strip shape in the longitudinal direction EH, the second compressed active material layer 6 being formed by pressing and compressing in the thickness direction GH to have a thickness of about 60 μm. This second compressed active material layer 6 will be also simply referred to as a compressed active material layer 6. Furthermore, the current collecting foil 3 includes side parts located on both sides in the width direction FH and extended in the longitudinal direction EH, the side parts having neither the compressed active material layer 5 nor the compressed active material layer 6 so that the current collecting foil 3 is exposed in the thickness direction GH.

This compressed strip-shaped electrode sheet 1 includes the current collecting foil 3, and the strip-shaped compressed active material layers 5 and 6 formed on the current collecting foil 3 as described above. The central part of the compressed strip-shaped electrode sheet 1 in the width direction FH is a strip-shaped active material portion 11 including the compressed active material layers 5 and 6 in the thickness direction GH. In contrast, each of the side parts of the compressed strip-shaped electrode sheet 1 in the width direction FH, which are each arranged on one of both sides of the active material portion 11 in the width direction FH, is an active-material absent portion 12 having neither the compressed active material layer 5 nor the compressed active material layer 6 and having a thinner thickness than the active material portion 11.

The compressed active material layers 5 and 6 are each constituted of active material particles, conductive particles, and a binder. In the first embodiment, the active material particles are lithium transition metal composite oxide particles, specifically, lithium-nickel-cobalt-manganese composite oxide particles. The conductive particles are acetylene black (AB) particles and the binder is polyvinylidene fluoride (PVDF).

Figure 2:
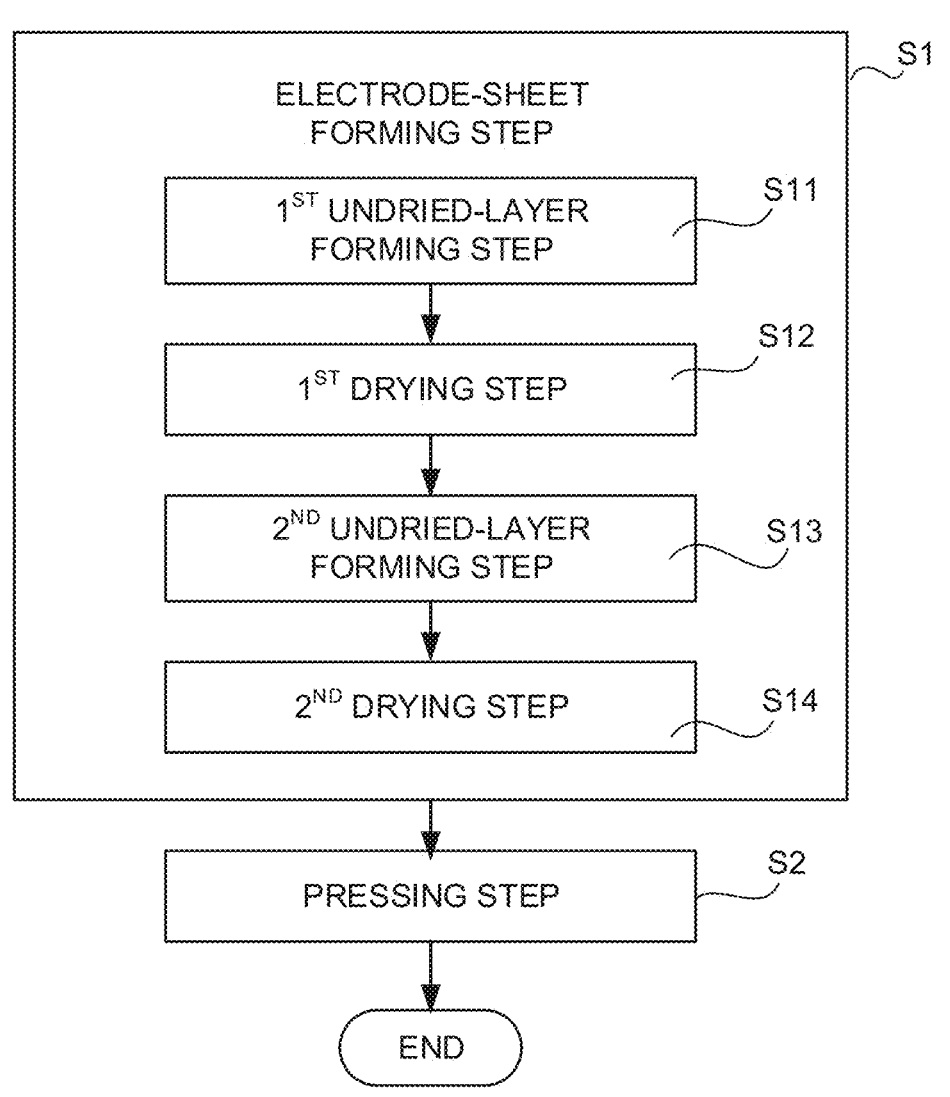
FIG. 2 is a flowchart shoring a method for producing the compressed strip-shaped electrode sheet in the first and second embodiments.

Next, a method for producing the compressed strip-shaped electrode sheet 1 will be described below, referring to FIGS. 2 to 4. In an electrode sheet forming step S1 (see FIG. 2), a strip-shaped electrode sheet 1Z before being pressed is produced first. This electrode sheet forming step S1 includes a first undried-layer forming step S11, a first drying step S12, a second undried-layer forming step S13, and a second drying step S14, which are performed in this order.

In the first undried-layer forming step S11, a first undried active material layer 5X is formed in a strip shape on the first main surface 3a of the current collecting foil 3. Specifically, active material particles (lithium-nickel-cobalt-manganese composite oxide particles in the first embodiment), conductive particles (AB particles in the first embodiment), a binder (PVDF in the first embodiment), and dispersion medium (N-methyl pyrrolidone (NMP) in the first embodiment) are mixed to prepare an active material paste in advance. In the first undried-layer forming step S11, while the current collecting foil 3 is being conveyed in the longitudinal direction EH, the active material paste is ejected onto the central part of the first main surface 3a of the current collector foil 3 in the width direction FH by a coating die (not shown) to continuously form the first undried active material layer 5X in a strip shape.

Subsequently, in the first drying step S12, a strip-shaped electrode sheet obtained in the first undried-layer forming step S1 is conveyed into a drying device (not shown), and hot air is blown onto the first undried active material layer 5X for heating and drying, thereby forming a first active material layer 5Z, which will be hereinafter also simply referred to as an active material layer 5Z.

Subsequently, in the second undried-layer forming step S13, in the same manner as in the first undried-layer forming step S11, a second undried active material layer 6X is formed in a strip shape on the central part of the second main surface 3b in the width direction FH, located on the opposite side of the current collector foil 3.

In the second drying step S14, in the same manner as in the first drying step S12, hot air is blown onto the second undried active material layer 6X of the strip-shaped electrode sheet obtained in the second undried-layer forming step S13 for heating and drying, thereby forming a second active material layer 6Z, which will be hereinafter also simply referred to as an active material layer 6Z. Thus, the strip-shaped electrode sheet 1Z before being pressed is produced.

In this strip-shaped electrode sheet 1Z including the current collecting foil 3 and the strip-shaped active material layers 5Z and 6Z, the central part in the width direction FH forms a strip-shaped active material portion 11 including the active material layers 5Z and 6Z in the thickness direction GH, and side parts each arranged on one of both sides of the active material portion 11 in the width direction FH each form a strip-shaped active-material absent portion 12 having neither the active material portion 5Z nor the active material portion 6Z in the thickness direction GH.

In a pressing step S2 (see FIG. 2), using a roll press apparatus 100 (see FIGS. 3 and 4), the strip-shaped electrode sheet 1Z produced in the electrode sheet forming step S1 is roll-pressed in the thickness direction GH while being conveyed in the longitudinal direction EH, so that the active material layers 5Z and 6Z are each compressed, forming into the compressed active material layers 5 and 6.

This roll press apparatus 100 will be described below. The roll press apparatus 100 is provided with a first press roll 110 and a second press roll 120 which are arranged in parallel with each other and spaced with a roll gap KA, and an upstream-side conveying roll 130 placed on an upstream side EUH (i.e., on a left side in FIG. 3) more than the first press roll 110 and the second press roll 120 and a downstream-side conveying roll 135 placed on a downstream side EDH (i.e., on a right side in FIG. 3) more than the first press roll 110 and the second press roll 120.

The first press roll 110 and the second press roll 120 respectively include roll surfaces 110m and 120m, which are made of stainless steel. The first press roll 110 and the second press roll 120 are each connected to corresponding motors (not shown) so that the first press roll 110 is rotatable counterclockwise in FIG. 3 and the second press roll 120 is rotatable clockwise in FIG. 3. In this first embodiment, the aforementioned strip-shaped electrode sheet 1Z is conveyed with the first active material layer 5Z facing upward in FIGS. 3 and 4 and the second active material layer 6Z facing downward in FIGS. 3 and 4. Accordingly, the first press roll 110 contacts the first active material layer 5Z of the strip-shaped electrode sheet 1Z, and the second press roll 120 contacts the second active material layer 6Z of the strip-shaped electrode sheet 1Z.

Figure 3:
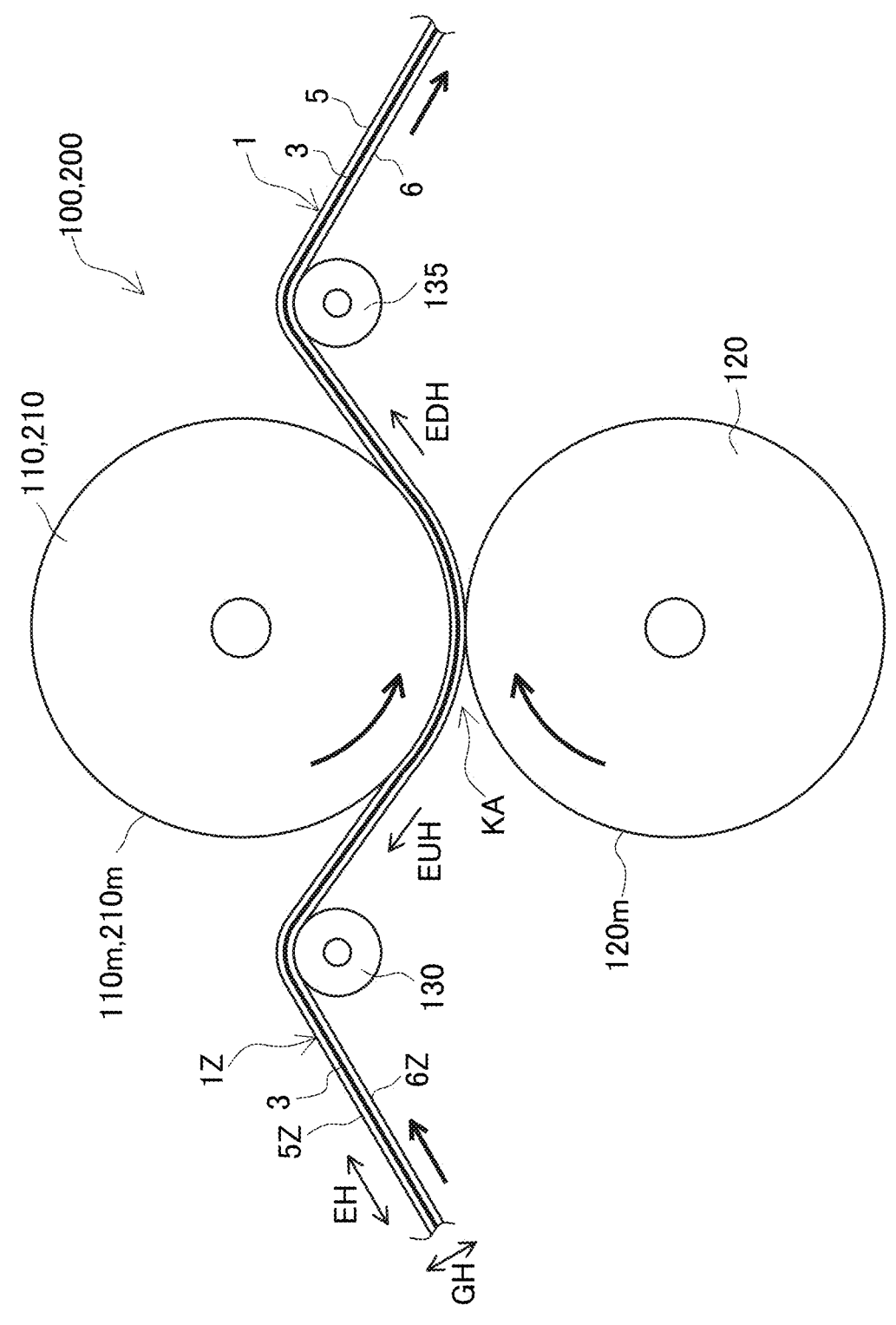
FIG. 3 is an explanatory view of a roll press apparatus seen from a lateral side in the first and second embodiments.
Figure 4:
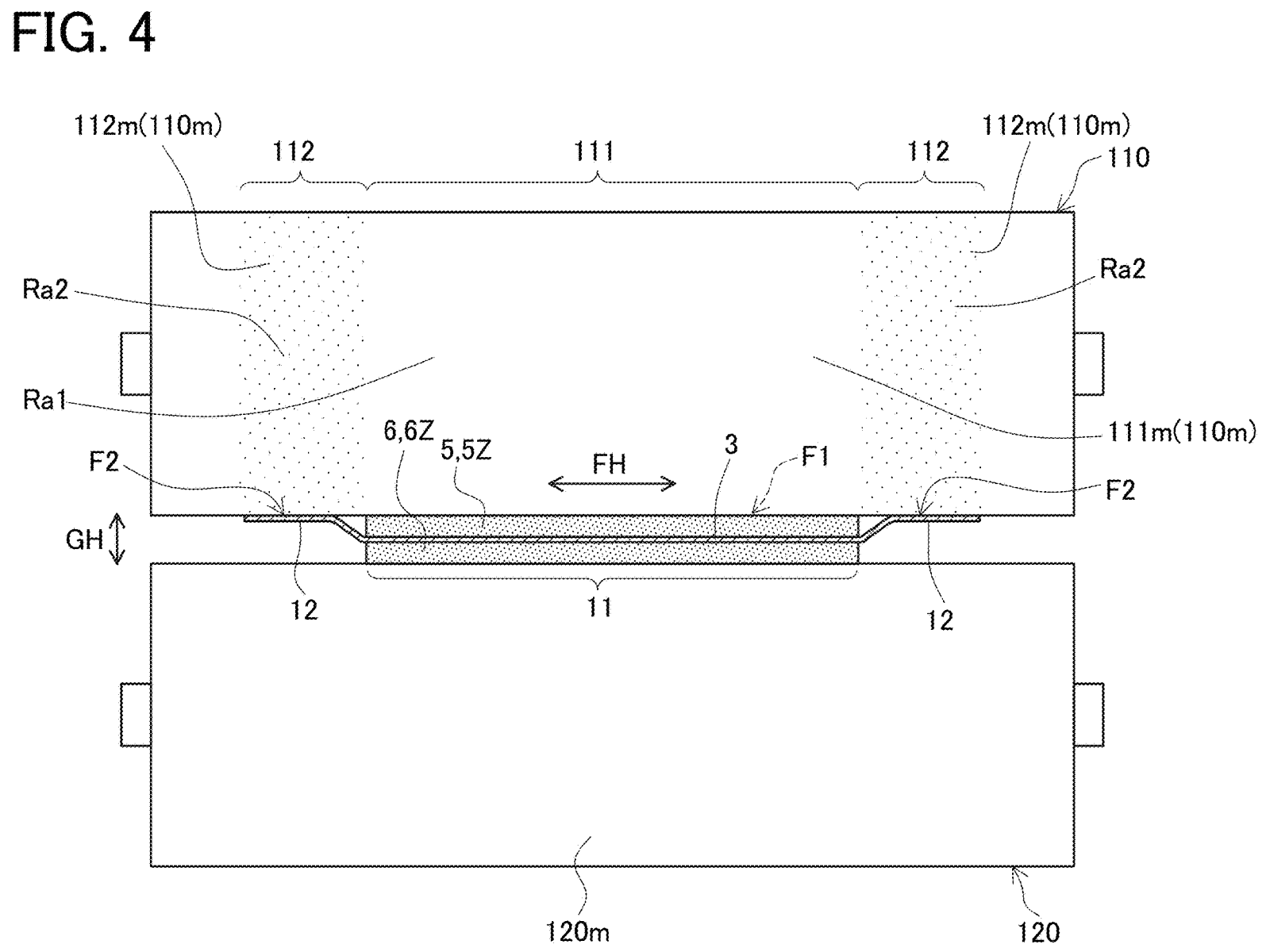
Figure 6:
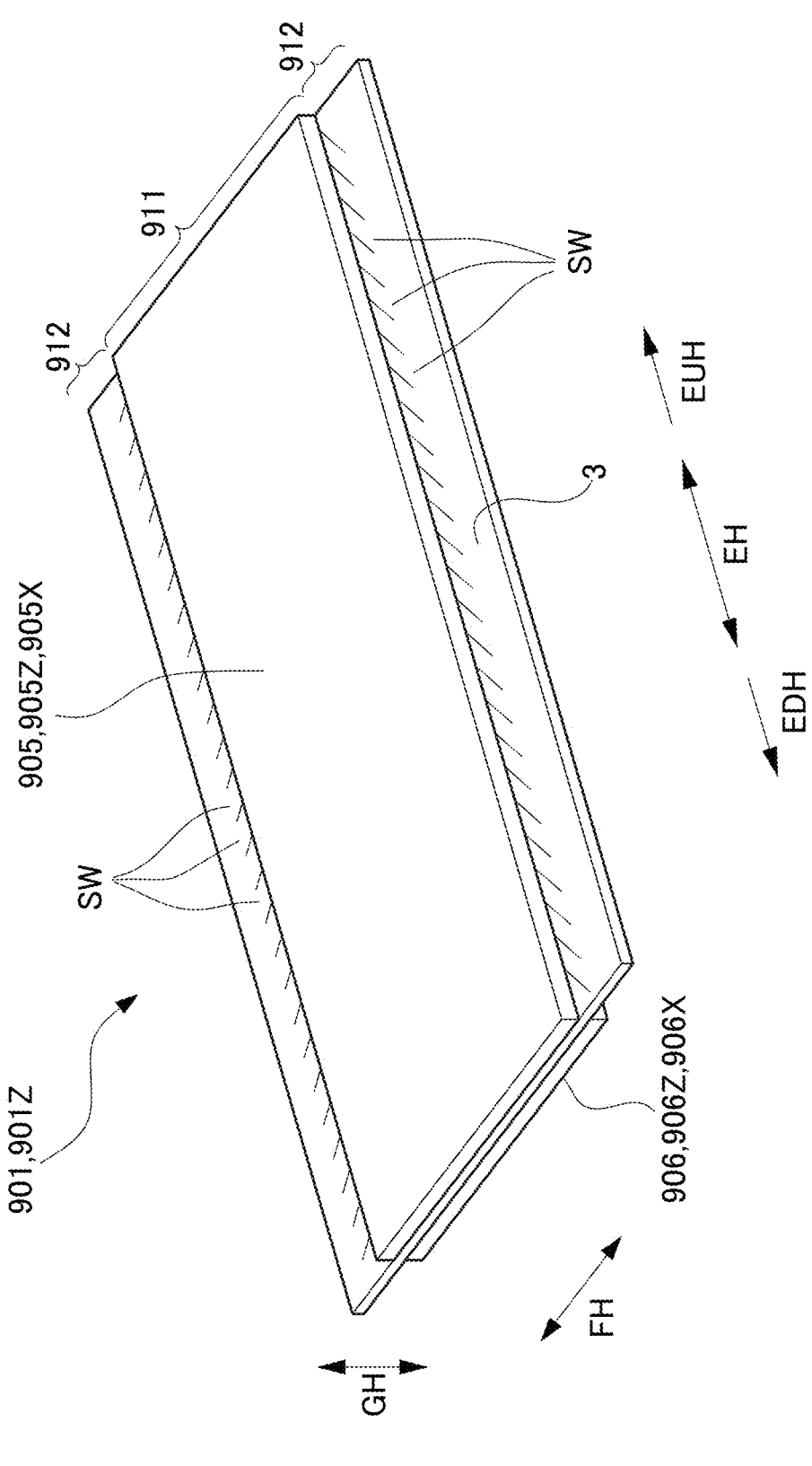
FIG. 6 is a perspective view of a compressed strip-shaped electrode sheet in a conventional art.

The upstream-side conveying roll 130 and the downstream-side conveying roll 135 are arranged to contact the second active material layer 6Z of the strip-shaped electrode sheet 1Z and located at a higher position than the roll gap KA provided between the first press roll 110 and the second press roll 120 in FIG. 3. Accordingly, the first press roll 110 and the strip-shaped electrode sheet 1Z contact each other at a wrap angle. In addition, as shown in FIG. 4, the first press roll 110 contacts the strip-shaped electrode sheet 1 over almost the entire width direction FH (in a right-left direction in FIG. 4). In other words, the first press roll 110 not only contacts the thick active material portion 11 (i.e., the first active material layer 5Z thereof) of the strip-shaped electrode sheet 1Z, but also contacts the thin active-material absent portions 12 (i.e., the current collecting foil 3) of the strip-shaped electrode sheet 1Z. Of the first press roll 110, the central portion in the width direction FH, which contacts the active material portion 11 of the strip-shaped electrode sheet 1, is a first contact part 111, and two side portions in the width direction FH, which contact the corresponding active-material absent portions 12 of the strip-shaped electrode sheet 1, are each a second contact part 112.

The second contact part 112 of the first press roll 110 has a large frictional-force generating form, differently from the first contact part 111. Specifically, in the first embodiment, the roll surface 111*m* of the first contact part 111 is mirror-polished so that the surface roughness Ra1 (hereinafter, also simply referred to as the surface roughness Ra1 of the first contact part 111) is about 0.1 μm. In contrast, the surface roughness Ra2 of the roll surface 112*m* of the second contact part 112 (hereinafter, also simply referred to as the surface roughness Ra2 of the second contact part 112) is larger than Ra1, and Ra2 is 0.2 μm or more (about 0.5 μm in the first embodiment). Due to this difference between the surface roughness Ra1 and the surface roughness Ra2, the frictional force F2 generated between the second contact part 112 of the first press roll 110 and each active-material absent portion 12 of the strip-shaped electrode sheet 1Z is larger than the imaginary frictional force F1 which would be generated if the active-material absent portions 12 of the strip-shaped electrode sheet 1Z were made to contact the first contact part 111 of the first press roll 110 (F2>F1).

In the pressing step S2, the strip-shaped electrode sheet 1Z is roll-pressed by the first press roll 110 and the second press roll 120 so that the active material layers 5Z and 6Z are compressed to respectively form the compressed active material layers 5 and 6. At that time, as described above, the surface roughness Ra2 of each second contact part 112 of the first press roll 110 is larger than the surface roughness Ra1 of the first contact part 111. Thus, a relatively large frictional force F2 is generated between the active-material absent portions 12 of the strip-shaped electrode sheet 1 and the second contact part 112 of the first press roll 110. This frictional force F2 disperses the tension applied in a downstream direction to the active-material absent portions 12, thus reducing the reaction force generated in a part of the active-material absent portions 12 near the boundary with the active material portion 11. This configuration can therefore prevent the generation of oblique wrinkles in the active-material absent portions 12 near that boundary.

It was also considered to increase the surface roughness Ra1 of the first contact part 111 of the first press roll 110 to the same magnitude as the surface roughness Ra2 of each second contact part 112. In such a case, however, defects are likely to occur; for example, the active material layers 5Z and 6Z could adhere to the roll surface 110*m* of the first press roll 110 (i.e., the roll surface 111*m* of the first contact part 111) during roll press. For this reason, as described above, it is preferable to increase the surface roughness Ra2 of the second contact part 112 more than the surface roughness Ra1 of the first contact part 111.

As described above, in the roll press apparatus 100 and the production method of the compressed strip-shaped electrode sheet 1, the pressing step S2 is performed using the first press roll 110 with the second contact parts 112 configured to have a large frictional-force generating form, differently from the first contact part 111 configured to contact the active material portion 11 of the strip-shaped electrode sheet 1Z. Specifically, the second contact parts 112 of the first press roll 110 each have the large frictional-force generating form that causes a larger frictional force F2 to be generated with respect to the active-material absent portions 12 of the strip-shaped electrode sheet 1Z than the imaginary frictional force F1 which would be generated if the active-material absent portions 12 of the strip-shaped electrode sheet 1Z were made to contact the first contact part 111 of the first press roll 110. Accordingly, when the strip-shaped electrode sheet 1Z is roll-pressed, the tension applied in a downstream direction to the active-material absent portions 12 is dispersed by the relatively large frictional force F2, thereby reducing the reaction force generated in the active-material absent portions 12 near the boundary with the active material part 11. This configuration prevents oblique wrinkles from occurring in the active-material absent portions 12 near that boundary.

Second Embodiment

Figure 5:
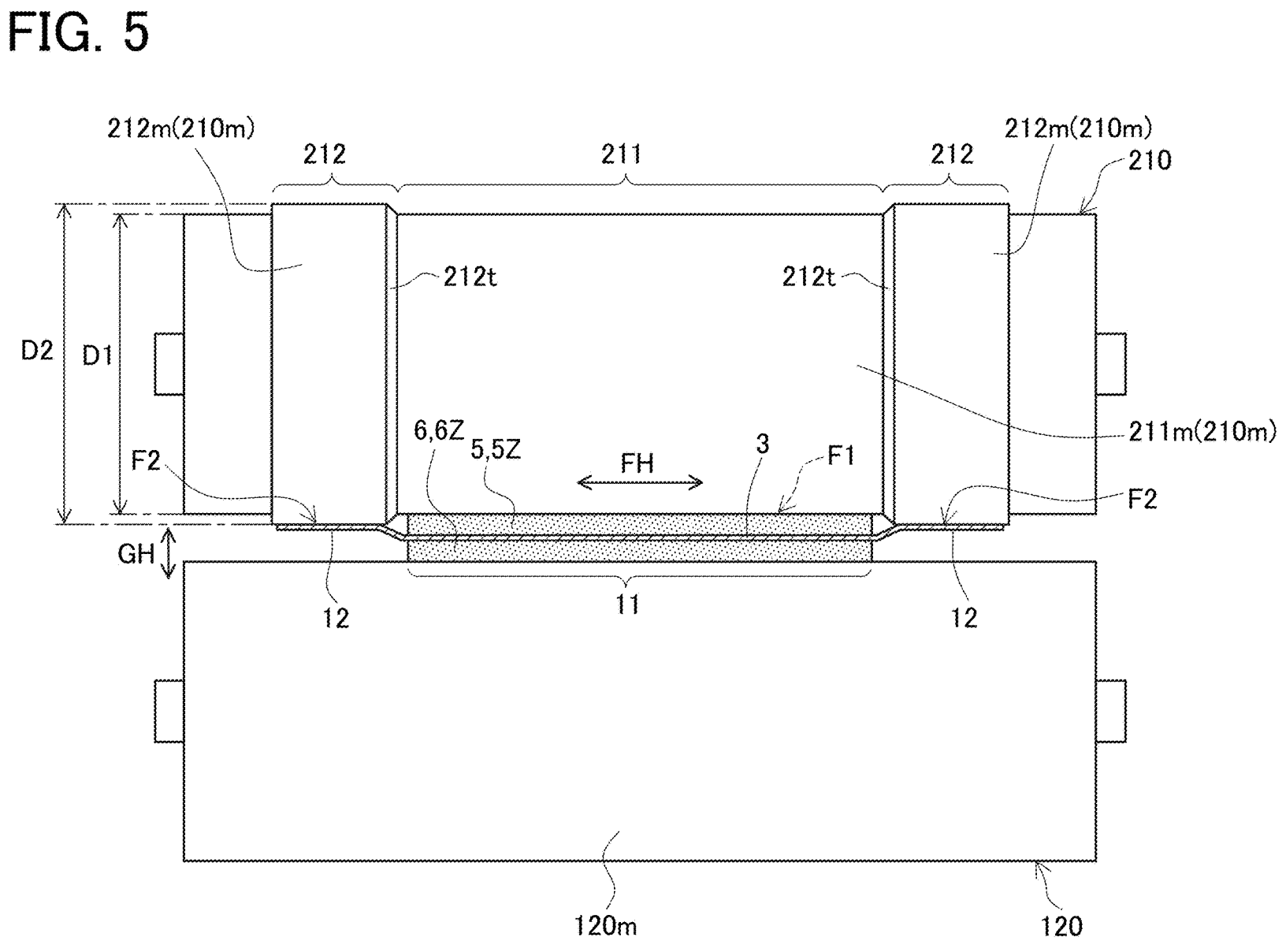

Next, a second embodiment will be described. In the foregoing first embodiment, the pressing step S2 is performed using the first press roll 110 including the second contact parts 112 having the surface roughness Ra2 larger than the surface roughness Ra1 of the first contact part 111 (see FIG. 4). In contrast, the second embodiment differs from the first embodiment in that the pressing step S2 is performed using a first press roll 210 including second contact parts 212 each having a roll diameter D2 larger than a roll diameter D1 of a first contact part 211 (D2>D1) (see FIG. 5).

A roll press apparatus 200 in this second embodiment is provided with the first press roll 210 formed of a press roll having a stepped columnar shape. In this first press roll 210, each second contact part 212 has a large frictional-force generating form. Specifically, the first contact part 211 of the first press roll 210, which comes into contact with the active material portion 11 of the strip-shaped electrode sheet 1Z, is configured similarly to the first contact part 111 of the first press roll 210 in the first embodiment. In contrast, the second contact parts 212 of the first press roll 210, which come into contact with the active-material absent portions 12 of the strip-shaped electrode sheet 1Z, are each formed with the roll diameter D2 larger by 30 μm than the roll diameter D1 of the first contact part 211. Further, a part 212*t* of each second contact part 212, which is located close to the boundary with the first contact part 211, is tapered with no corner. This shape is intended to reliably prevent possible damages of the active-material absent portions 12 of the strip-shaped electrode sheet 1Z due to touching or hitting against the corner.

In the second embodiment, a roll surface 210*m* of the first press roll 210 has been entirely mirror-polished. Thus, the surface roughness Ra1 of a roll surface 211*m* of the first contact part 211 and the surface roughness Ra2 of a roll surface 212*m* of the second contact part 212 are equal (Ra1=Ra2).

Since the roll diameter D2 of each second contact part 212 of the first press roll 210 is larger than the roll diameter D1 of the first contact part 211, the frictional force F2 to be generated between the second contact parts 112 and the active-material absent portions 12 of the strip-shaped electrode sheet 1Z is larger than the imaginary frictional force F1 which would be generated if the active-material absent portions 12 of the strip-shaped electrode sheet 1Z were made to contact the first contact part 111 (F2>F1). This is because the force of pressing the active-material absent portions 12 against the second contact part 112 is made large, so that the frictional force F2 is increased.

In this second embodiment, the pressing step S2 is performed using the roll press apparatus 200 provided with the first press roll 210 configured as above. In this second embodiment, a relatively large frictional force F2 also is generated between the active-material absent portions 12 of the strip-shaped electrode sheet 1 and the second contact parts 212 of the first press roll 210. This frictional force F2 causes the tension applied to the active-material absent portions 12 in the downstream direction to be dispersed. Thus, the reaction force generated in the part of each active-material absent portion 12 near the boundary with the active material portion 11 is reduced. This can suppress the generation of wrinkles in the active-material absent portions 12.

The present disclosure is described as above in the first and second embodiments, but is not limited thereto. The present disclosure may be in other specific forms without departing from the essential characteristics thereof.

For instance, in the first and second embodiments, the present disclosure is embodied for the compressed strip-shaped electrode sheet 1 which is a positive electrode sheet, but may be embodied for a compressed strip-shaped electrode sheet 1 which is a negative electrode sheet.

The second embodiment embodies the first press roll 210 formed in a stepped shape as the first press roll in which the roll diameter D2 of each second contact part is larger than the roll diameter D1 of the first contact part, but is not limited thereto. For example, the first press roll may be a press roll in which the roll diameter D2 of each second contact part is larger than the roll diameter D1 of the first contact part by attaching a plastic tape or a metal tape to or forming a coating layer made of resin or metal on a portion of a cylindrical press roll that serves as the second contact parts.

In the second embodiment, the first press roll 210 is configured such that the surface roughness Ra1 of the first contact part 211 is equal to the surface roughness Ra2 of the second contact parts 212. As an alternative, the first press roll 210 may be configured such that the surface roughness Ra2 of the second contact part 212 is larger than the surface roughness Ra1 of the first contact parts 211 as in the first embodiment. This configuration that the roll diameter D2 of each second contact part 212 is larger than the roll diameter D1 of the first contact part 211 and further the surface roughness Ra2 of each second contact part 212 is larger than the surface roughness Ra1 of the first contact part 211 can generate a still larger frictional force F2 between each second contact part 212 and each corresponding active-material absent portion 12 of the strip-shaped electrode sheet 1Z than the imaginary frictional force F1 which would be generated between the first contact part 211 and the active-material absent portion 12. Consequently, it is possible to effectively prevent the generation of wrinkles in the active-material absent portion 12.

REFERENCE SIGNS LIST

1 Compressed strip-shaped electrode sheet
1Z Strip-shaped electrode sheet
3 Current collecting foil
First compressed active material layer
5Z First active material layer
6 Second compressed active material layer
6Z Second active material layer
11 Active material portion
12 Active-material absent portion
100 Press roll apparatus
110, 210 First press roll
111, 211 First contact part
112, 212 Second contact part
120 Second press roll
EH Longitudinal direction
FH Width direction
GH Thickness direction
KA Roll gap
F1 Imaginary frictional force
F2 Frictional force
S1 Electrode sheet forming step
S2 Pressing step

What is claimed is:

1. A roll press apparatus configured to roll-press an uncompressed strip-shaped electrode sheet, which is provided with: a strip-shaped current collecting foil; and an uncompressed strip-shaped active material layer located on the strip-shaped current collecting foil and extended in a longitudinal direction of the strip-shaped current collecting foil, while conveying the uncompressed strip-shaped electrode sheet in the longitudinal direction to compress uncompressed strip-shaped the active material layer of the uncompressed strip-shaped electrode sheet, the uncompressed strip-shaped electrode sheet including:
an uncompressed strip-shaped active material portion extended in the longitudinal direction and including the uncompressed strip-shaped active material layer in a thickness direction of the strip-shaped current collecting foil; and
a strip-shaped active-material absent portion extended in the longitudinal direction and arranged adjacent to the uncompressed strip-shaped active material portion in a width direction of the strip-shaped current collecting foil, wherein the strip-shaped active-material absent portion does not include the uncompressed strip-shaped active material layer in the thickness direction and has a thinner thickness than the uncompressed strip-shaped active material portion, wherein the roll press apparatus comprises a first press roll and a second press roll, which are arranged in parallel to each other with a gap, the first press roll is placed in contact with the uncompressed strip-shaped electrode sheet so that the uncompressed strip-shaped electrode sheet is wrapped around the first press roll at a wrap angle larger than a zero degree and includes:

a first contact part, around which the uncompressed strip-shaped active material portion of the uncompressed strip-shaped electrode sheet is wrapped at the wrap angle; and a second contact part, around which the strip-shaped active-material absent portion of the uncompressed strip-shaped electrode sheet is wrapped at the wrap angle, and the second contact part of the first press roll is configured, differently from the first contact part, to have a large frictional-force generating form that causes a larger frictional force to be generated between the second contact part and the strip-shaped active-material absent portion of the uncompressed strip-shaped electrode sheet than an imaginary frictional force which would be generated if the first contact part of the first press roll were made to contact the active-material absent portion of the strip-shaped electrode sheet, and while only the second contact part of the first press roll is in direct contact with the strip-shaped active-material absent portion of the uncompressed strip-shaped electrode sheet at the wrap angle, the uncompressed strip-shaped active material portion of the uncompressed strip-shaped electrode sheet is roll-pressed by the first contact part of the first press roll and the second press roll.

2. The roll press apparatus according to claim 1, wherein the second contact part of the first press roll has the large frictional-force generating form with a larger roll diameter than a roll diameter of the first contact part.

3. The roll press apparatus according to claim 1, wherein the second contact part of the first press roll has the large frictional-force generating form with a larger surface roughness than a surface roughness of the first contact part.

4. The roll press apparatus according to claim 3, wherein the second contact part of the first press roll has the large frictional-force generating form with a larger roll diameter than a roll diameter of the first contact part.

5. A method for producing a compressed strip-shaped electrode sheet including a strip-shaped current collecting foil and a compressed strip-shaped active material layer compressed in a thickness direction of the current collecting foil, wherein the method comprises:

electrode-sheet forming of forming an uncompressed strip-shaped electrode sheet provided with the strip-shaped current collecting foil and an uncompressed strip-shaped active material layer located on the strip-shaped current collecting foil and extended in a longitudinal direction of the strip-shaped current collecting foil, the uncompressed strip-shaped electrode sheet including:

an uncompressed strip-shaped active material portion extended in the longitudinal direction and including the uncompressed strip-shaped active material layer in the thickness direction of the strip-shaped current collecting foil; and a strip-shaped active-material absent portion extended in the longitudinal direction and arranged adjacent to the uncompressed strip-shaped active material portion in a width direction of the strip-shaped current collecting foil, wherein the strip-shaped active-material absent portion does not include the uncompressed strip-shaped active material portion in the thickness direction and has a thinner thickness than the uncompressed strip-shaped active material portion; and pressing of roll-pressing the uncompressed strip-shaped electrode sheet by a first press roll and a second press roll, which are arranged in parallel to each other with a roll gap, while conveying the uncompressed strip-shaped electrode sheet in the longitudinal direction to form the compressed strip-shaped electrode sheet provided with the compressed strip-shaped active material layer, the first press roll is placed in contact with the uncompressed strip-shaped electrode sheet so that the uncompressed strip-shaped electrode sheet is wrapped around the first press roll at a wrap angle larger than a zero degree and includes:

a first contact part, around which the uncompressed strip-shaped active material portion of the uncompressed strip-shaped electrode sheet is wrapped at the wrap angle; and a second contact part, around which the strip-shaped active-material absent portion of the uncompressed strip-shaped electrode sheet is wrapped at the wrap angle, the second contact part of the first press roll is configured, differently from the first contact part, to have a large frictional-force generating form that causes a larger frictional force to be generated between the second contact part and the strip-shaped active-material absent portion of the uncompressed strip-shaped electrode sheet than an imaginary frictional force which would be generated if the first contact part of the first press roll were made to contact the strip-shaped active-material absent portion of the uncompressed strip-shaped electrode sheet, and the pressing is performed to roll-press the uncompressed strip-shaped active material portion of the uncompressed strip-shaped electrode sheet with the first contact part of the first press roll and the second press roll in which the second contact part of the first press roll is located apart from the uncompressed strip-shaped active-material portion of the uncompressed strip-shaped electrode sheet, while the second press roll is placed apart from the strip-shaped active-material absent portion of the uncompressed strip-shaped electrode sheet, and only the second contact part of the first press roll is in direct contact with the strip-shaped active-material absent portion of the uncompressed strip-shaped electrode sheet at the wrap angle.

6. The method for producing a compressed strip-shaped electrode sheet according to claim 5, wherein the second contact part of the first press roll has the large frictional-force generating form with a larger roll diameter than a roll diameter of the first contact part.

7. The method for producing a compressed strip-shaped electrode sheet according to claim 5, wherein the second contact part of the first press roll has the large frictional-force generating form with a larger surface roughness than a surface roughness of the first contact part.

8. The method for producing a compressed strip-shaped electrode sheet according to claim 7, wherein the second contact part of the first press roll has the large frictional-force generating form with a larger roll diameter than a roll diameter of the first contact part.

* * * * *